United States Patent
Johnson

(10) Patent No.: US 11,065,559 B2
(45) Date of Patent: Jul. 20, 2021

(54) CYCLONIC INLET DIVERTER

(71) Applicant: EnXL LLC, Midland, TX (US)

(72) Inventor: Bruce D. Johnson, Midland, TX (US)

(73) Assignee: EnXL LLC, Midland, TX (US)

( * ) Notice: Subject to any disclaimer, the term of this patent is extended or adjusted under 35 U.S.C. 154(b) by 0 days.

(21) Appl. No.: 16/724,023

(22) Filed: Dec. 20, 2019

(65) Prior Publication Data

US 2020/0230522 A1 Jul. 23, 2020

Related U.S. Application Data

(60) Provisional application No. 62/784,102, filed on Dec. 21, 2018.

(51) Int. Cl.

| | | |
|---|---|---|
| *B01D 21/24* | (2006.01) |
| *B01D 17/038* | (2006.01) |
| *B01D 19/00* | (2006.01) |
| *B01D 17/02* | (2006.01) |
| *B01D 21/26* | (2006.01) |
| *B01D 21/00* | (2006.01) |
| *C02F 1/20* | (2006.01) |
| *C02F 1/40* | (2006.01) |

(Continued)

(52) U.S. Cl.
CPC ...... *B01D 17/0217* (2013.01); *B01D 17/0211* (2013.01); *B01D 19/0057* (2013.01); *B01D 21/0003* (2013.01); *B01D 21/0042* (2013.01); *B01D 21/0087* (2013.01); *B01D 21/2411* (2013.01); *B01D 21/2416* (2013.01); *B01D 21/265* (2013.01); *C02F 1/20* (2013.01); *C02F 1/40* (2013.01); *C02F 2101/32* (2013.01); *C02F 2103/10* (2013.01)

(58) Field of Classification Search
CPC ............ B01D 17/0217; B01D 19/0057; B01D 21/0003; B01D 21/0024; B01D 21/0087; B01D 21/2405; B01D 21/2411; B01D 21/2416; B01D 21/265; B01D 21/34; C02F 1/20; C02F 1/40
USPC .......... 210/788, 801, 519, 539; 95/253, 260, 95/261; 96/182, 183, 184
See application file for complete search history.

(56) References Cited

U.S. PATENT DOCUMENTS

| | | | | |
|---|---|---|---|---|
| 2,610,697 A | * | 9/1952 | Lovelady | ............... B01D 45/02 210/801 |
| 2,911,059 A | | 11/1959 | Spann | |
| 3,212,232 A | | 10/1965 | McMinn | |

(Continued)

*Primary Examiner* — Christopher Upton
(74) *Attorney, Agent, or Firm* — Polsinelli PC

(57) ABSTRACT

A cyclonic inlet diverter for initiating the separation of a multi-phase inlet fluid flow comprises an enclosed tubular body mounted crosswise within a larger separator vessel. The inlet diverter includes a splitter plate positioned within a center portion of the tubular body and configured to split the inlet flow into a first stream and a second stream, and a swirl plate positioned on each side of the splitter plate with angled surfaces configured to increase the cyclonic motion of the first and second streams within the tubular body. The inlet diverter further includes elongate apertures formed through bottom sidewall portions of the tubular body on each side of the splitter plate, an axial aperture formed through opposing end caps of the tubular body, and at least one radial aperture formed through lateral sidewall portions of the tubular body proximate each opposing end cap.

17 Claims, 9 Drawing Sheets
(3 of 9 Drawing Sheet(s) Filed in Color)

(51) Int. Cl.
*C02F 103/10* (2006.01)
*C02F 101/32* (2006.01)

(56) References Cited

U.S. PATENT DOCUMENTS

| | | |
|---|---|---|
| 3,304,697 A | 2/1967 | Ramsey |
| 3,623,608 A * | 11/1971 | Waterman .......... B01D 17/0205 |
| | | 210/539 |
| 3,722,184 A | 3/1973 | McMinn |
| 4,070,168 A | 1/1978 | Beattie |
| 4,187,089 A | 2/1980 | Hodgson |
| 4,539,023 A | 9/1985 | Boley |
| 4,617,031 A * | 10/1986 | Suh ....................... B01D 45/02 |
| | | 95/261 |
| 4,622,048 A | 11/1986 | Roberts et al. |
| 4,778,494 A | 10/1988 | Patterson |
| 5,080,792 A | 1/1992 | McGovern et al. |
| 5,378,378 A * | 1/1995 | Meurer ............... B01D 21/2411 |
| | | 210/519 |
| 6,537,458 B1 | 3/2003 | Polderman |
| 6,576,029 B2 | 6/2003 | West |
| 7,488,361 B2 | 2/2009 | Larnholm |
| 7,942,162 B2 | 5/2011 | Torres |
| 8,627,848 B2 | 1/2014 | Bambara |
| 9,643,105 B1 | 5/2017 | Walker et al. |
| 9,789,429 B2 | 10/2017 | Schook |
| 9,795,898 B2 | 10/2017 | Ernst et al. |
| 9,833,727 B1 | 12/2017 | Ball, IV |
| 9,873,067 B1 | 1/2018 | Ball, IV |
| 2005/0077235 A1* | 4/2005 | Rhodes ............... B01D 17/0217 |
| | | 210/539 |
| 2010/0269696 A1 | 10/2010 | Sarshar et al. |
| 2011/0247500 A1 | 10/2011 | Akhras et al. |
| 2016/0008741 A1* | 1/2016 | Beg .................... B01D 19/0057 |
| | | 96/182 |
| 2020/0114282 A1* | 4/2020 | Johnson ............. B01D 21/0087 |

* cited by examiner

20

CYCLONIC INLET DIVERTER

CROSS-REFERENCE TO RELATED APPLICATIONS

This application claims the benefit of U.S. Provisional Application No. 62/784,102 filed Dec. 21, 2018, which is incorporated by reference in its entirety herein, and for all purposes.

FIELD OF THE INVENTION

The present invention generally relates to water clarification systems, and more specifically to water clarification systems used in water processing facilities that receive contaminated water from hydrocarbon-producing wells.

SUMMARY

Briefly described, one embodiment of the present disclosure comprises a cyclonic inlet diverter for initiating the separation of a multi-phase fluid received from a fluid source. The cyclonic inlet diverter generally comprises an enclosed tubular body that is mounted crosswise within a larger separator vessel, proximate an inlet end of the separator vessel. The inlet diverter includes a splitter plate positioned within a center portion of the tubular body and configured to split the inlet flow into a first stream and a second stream, as well as one or more swirl plates positioned on each side of the splitter plate with angled surfaces configured to increase the cyclonic motion of the first and second streams within the tubular body. The inlet diverter further includes an elongate aperture formed through the bottom sidewall portion of the tubular body on each side of the splitter plate, an axial aperture formed through opposing end walls of the tubular body, and one or more radial apertures formed through lateral sidewall portions of the tubular body proximate each opposing end wall.

The inlet diverter also includes directing the multi-phase fluid from the fluid source into the center portion of the tubular body so as to split the inlet fluid flow against a leading edge of the splitter plate and induce the cyclonic motion with the swirl plates to initiate the separation of the multi-phase inlet fluid flow, wherein at least a majority portion of a solids constituent is directed downwardly outward from the inlet diverter through the elongate apertures, at least a majority portion of the gas constituent is directed axially outward from the inlet diverter through the axial apertures, and at least a majority portion of the oil constituent and at least a majority portion of the water constituent are directed laterally outward from the inlet diverter through the one or more radial apertures proximate each opposing end the tubular body.

BRIEF DESCRIPTION OF THE DRAWINGS

The patent application file contains at least one drawing executed in color. Copies of this patent or patent application publication with color drawing(s) will be provided by the Office upon request and payment of necessary fee.

Figure 1:
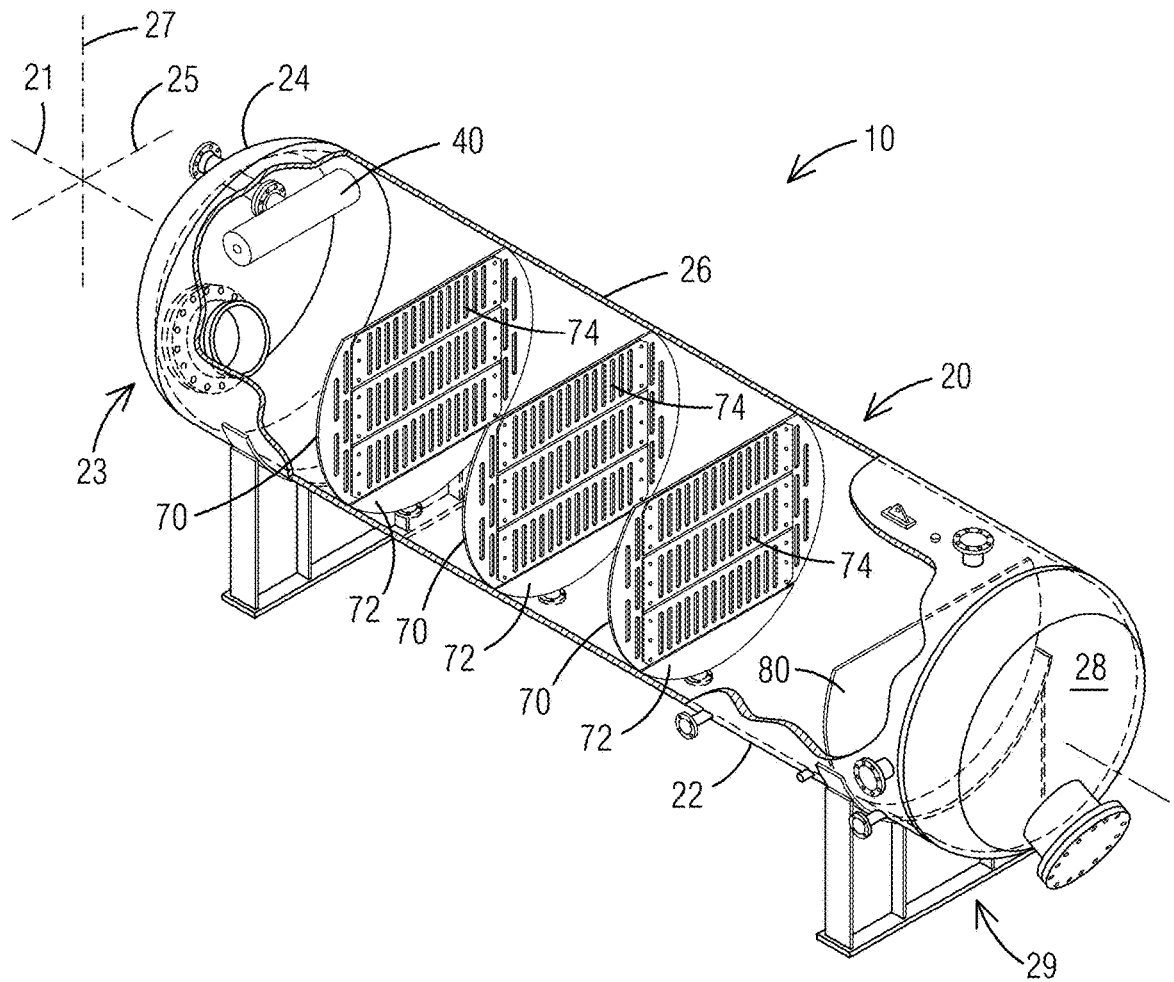
FIG. 1 is a perspective view of a horizontally-disposed, elongate multi-phase separator vessel including the cyclonic inlet diverter at an inlet end, in accordance with one representative embodiment of the present disclosure.
Figure 2:
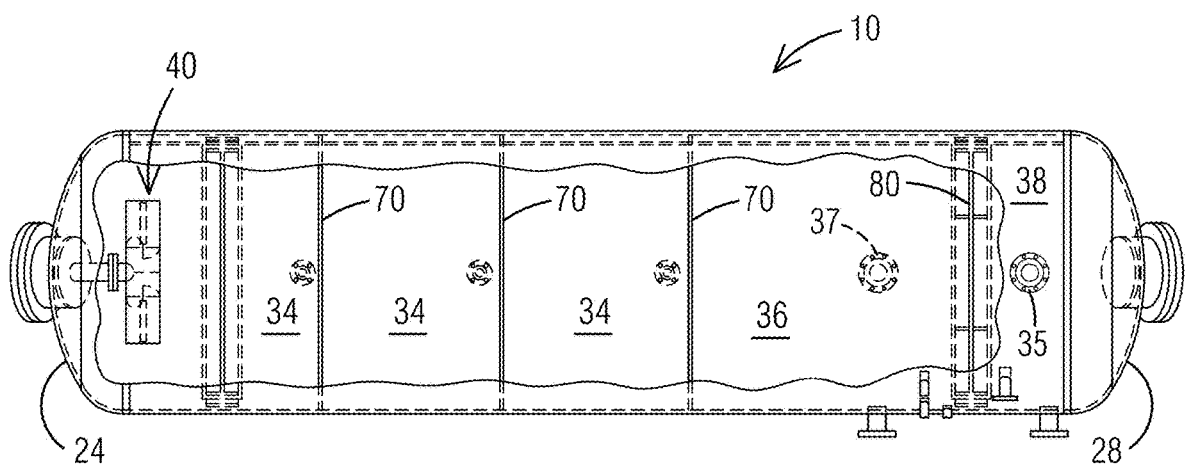
FIG. 2 is a cross-sectional top view of the separator vessel and cyclonic inlet diverter of FIG. 1.
Figure 3:
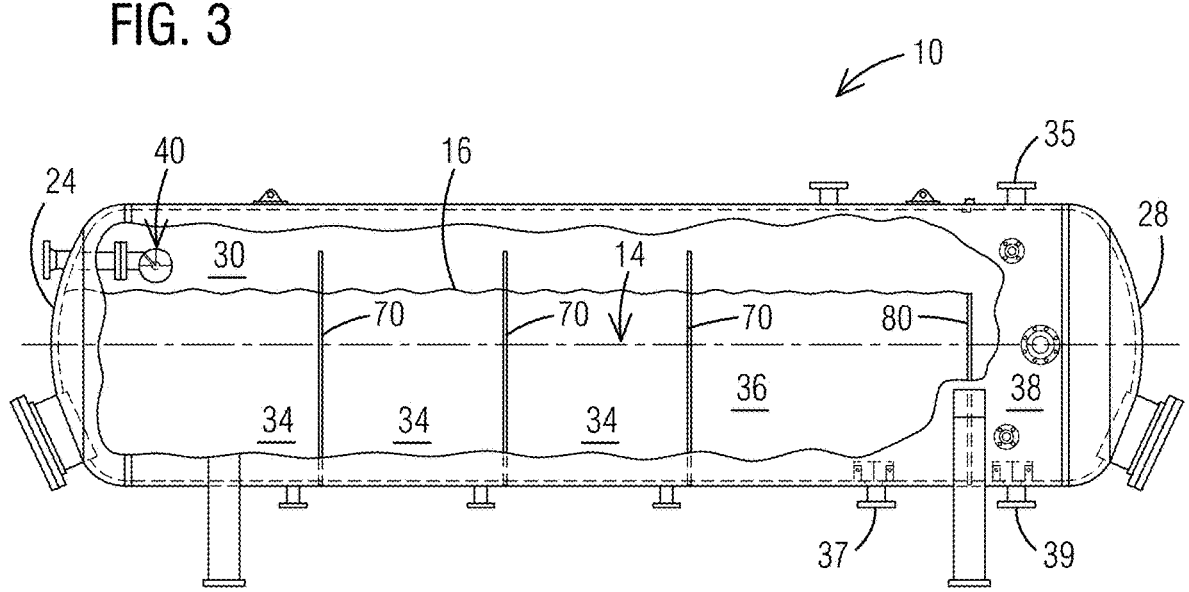
FIG. 3 is a cross-sectional side view of the separator vessel and cyclonic inlet diverter of FIG. 1.
Figure 4:
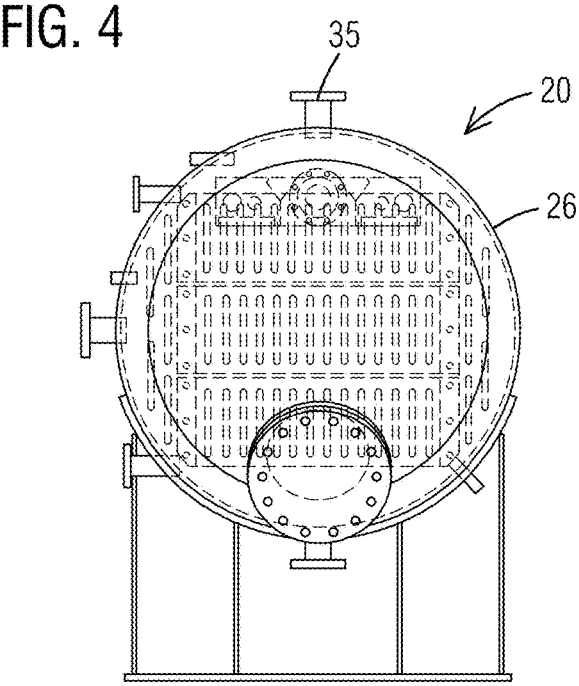
FIG. 4 is a cross-sectional end view of the separator vessel and cyclonic inlet diverter of FIG. 1.
Figure 5:
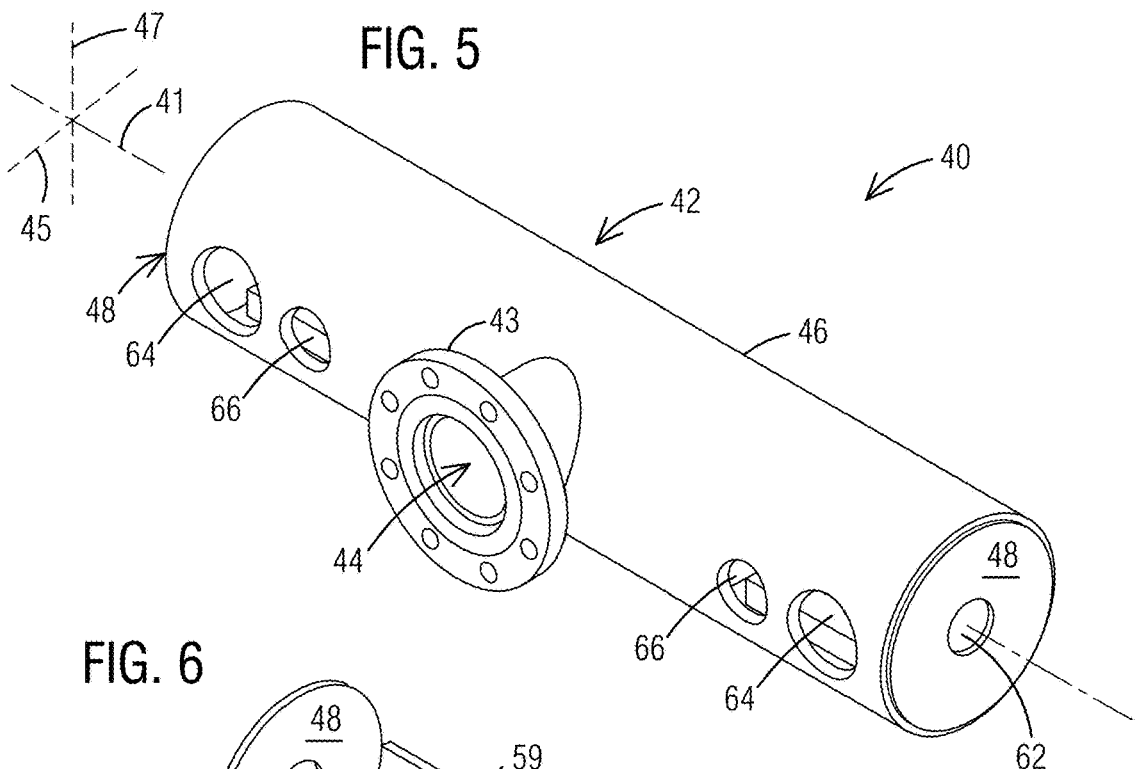
FIG. 5 is an exterior perspective view of a cyclonic inlet diverter for a multi-phase fluid, in accordance with another representative embodiment of the present disclosure.
Figure 6:
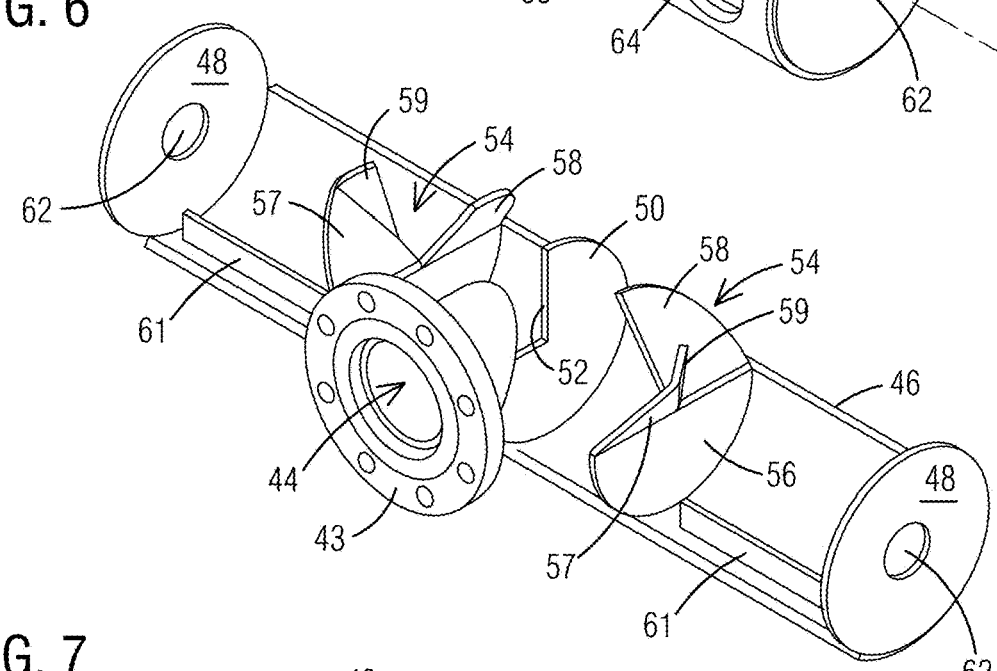
FIG. 6 is a cut-away perspective view of the cyclonic inlet diverter of FIG. 5.
Figure 7:
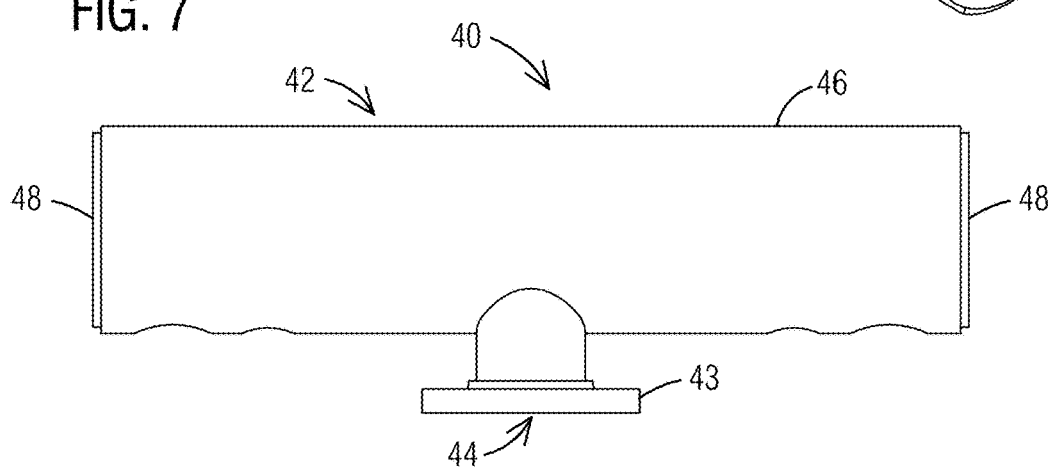
FIG. 7 is a top view of the cyclonic inlet diverter of FIG. 5.
Figure 8:
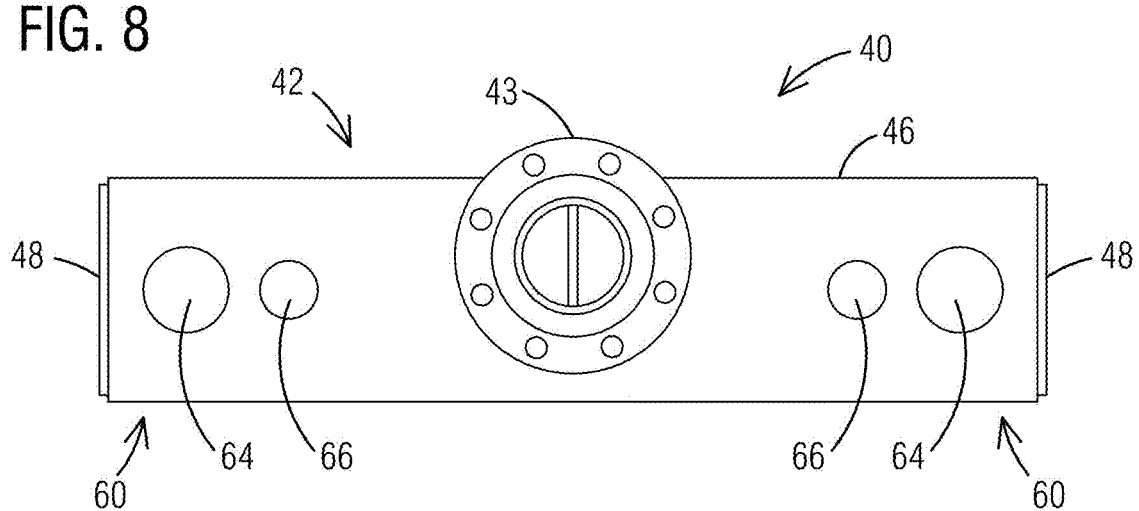
FIG. 8 is an inlet end side view of the cyclonic inlet diverter of FIG. 5.
Figure 9:
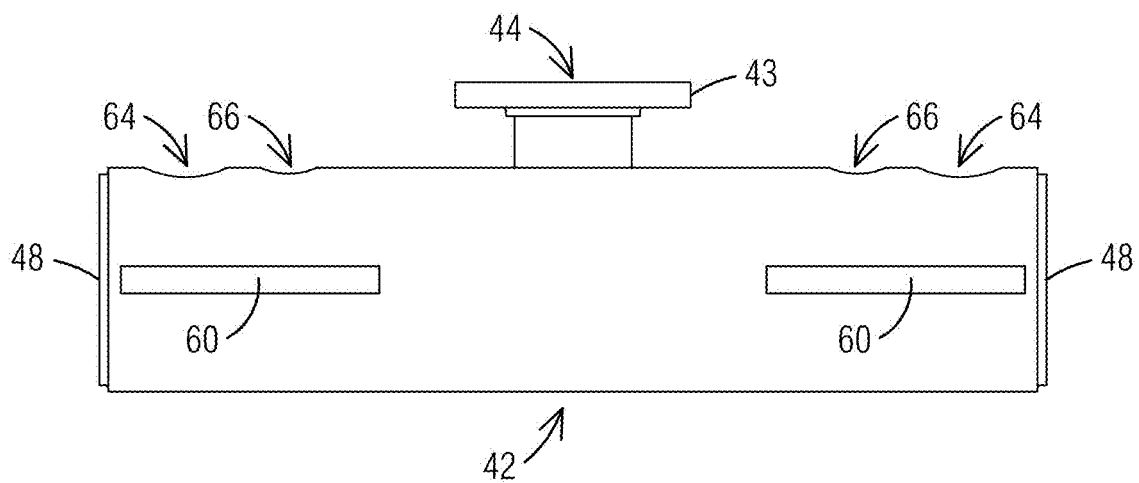
FIG. 9 is a bottom view of the cyclonic inlet diverter of FIG. 5.
Figure 10:
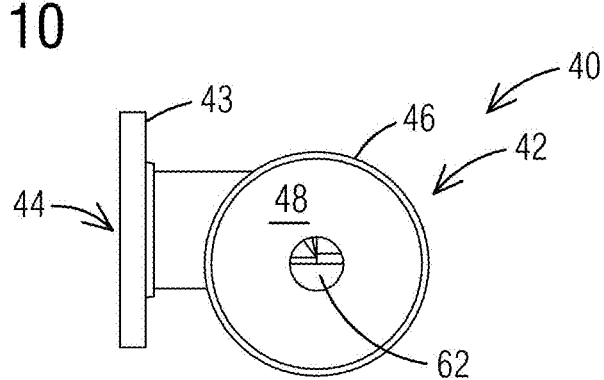
FIG. 10 is a side view of the cyclonic inlet diverter of FIG. 5.
Figure 11:
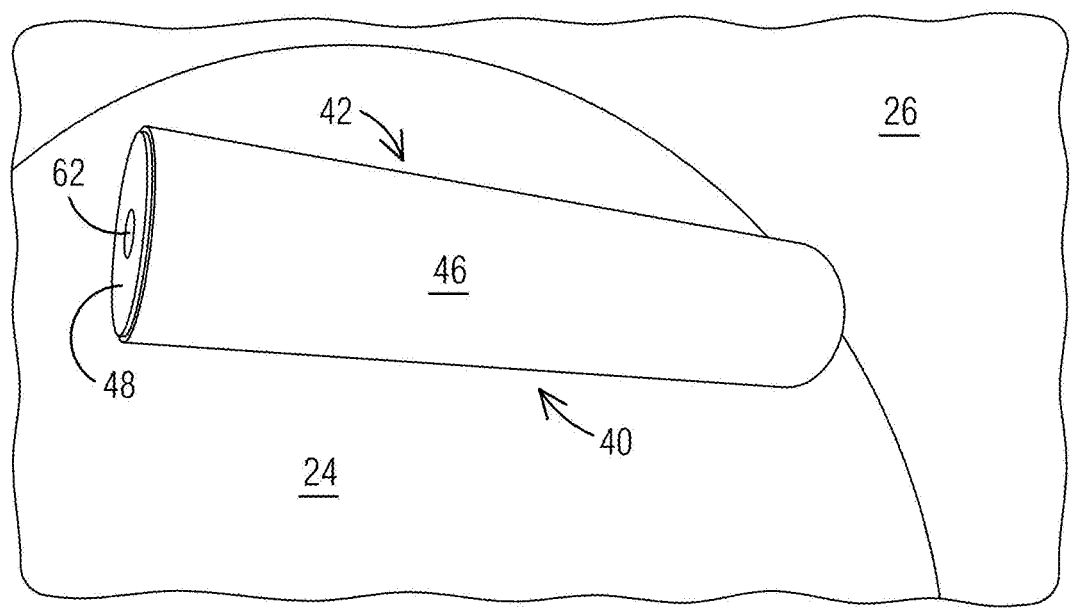
FIG. 11 is a lower perspective backside view of the cyclonic inlet diverter of FIG. 5 mounted within a separator vessel, in accordance with yet another embodiment of the present disclosure.
Figure 12:
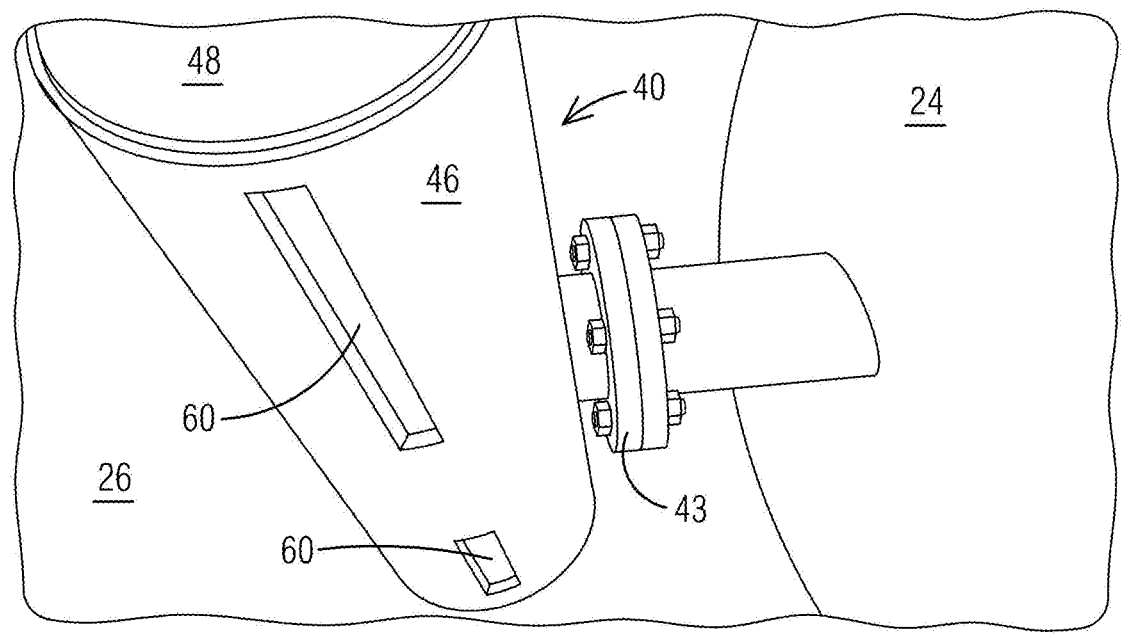
FIG. 12 is a lower perspective side view of the cyclonic inlet diverter of FIG. 11.
Figure 13:
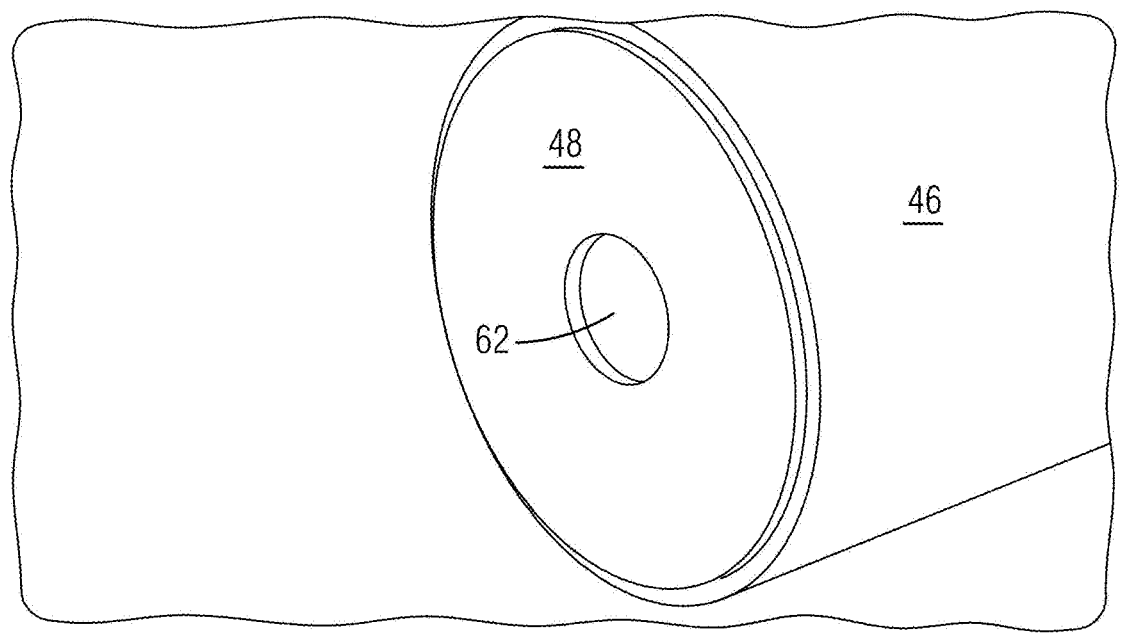
FIG. 13 is a close-up side view of the cyclonic inlet diverter of FIG. 11.
Figure 14:
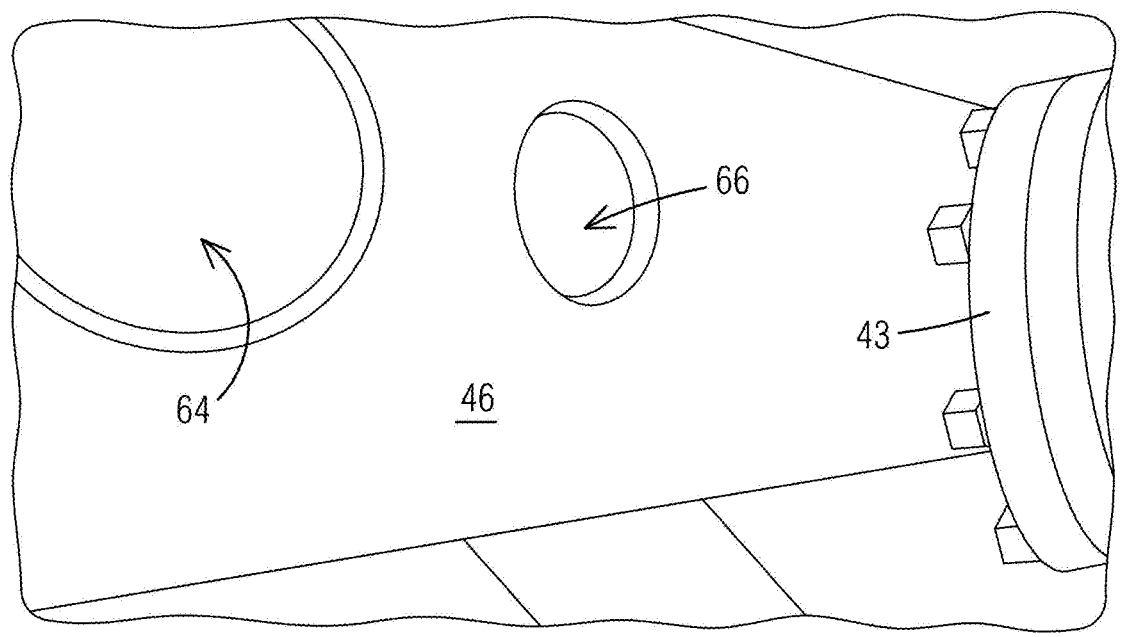
FIG. 14 is a close-up inlet end side view of the cyclonic inlet diverter of FIG. 11.
Figure 15:
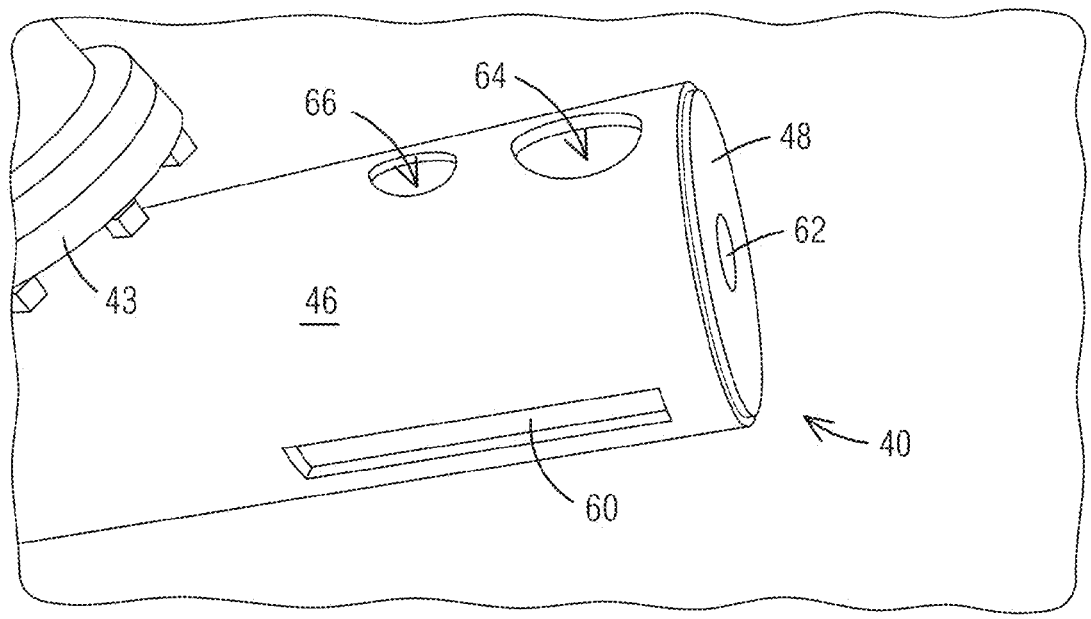
FIG. 15 is a close-up underside view of the cyclonic inlet diverter of FIG. 11.

Those skilled in the art will appreciate and understand that, according to common practice, various features and elements of the drawings described above are not necessarily drawn to scale, and that the dimensions and relative positions between the features or elements may be expanded, reduced or otherwise altered to more clearly illustrate the various embodiments of the present disclosure depicted therein.

DETAILED DESCRIPTION

The following description, in conjunction with the accompanying drawings, is provided as an enabling teaching or disclosure of exemplary embodiments of a cyclonic inlet diverter, typically for use within a linear or elongate multi-phase separator vessel or similar water clarification system for a separating a mixed or multi-phase fluid into its separate constituents, or for clarifying the primary constituent, such as water, from the other constituents, such as oil, gases and vapors, or particular matter, and the like. In one aspect the multi-phase separator vessel or water clarification system can be used or incorporated into a salt water disposal (SWD) facility or other water processing facility that receives contaminated water from one or more hydrocarbon-producing wells. It will be appreciated, however, that other applications for the cyclonic inlet diverter and for the multi-phase separator vessel, in addition to the clarification of produced oily water from hydrocarbon production wells, are also possible and considered to fall within the scope of the present disclosure.

The disclosure further includes one or more methods for initiating the separation of the separate constituents of the mixed or multi-phase fluid using the cyclonic inlet diverter. As described below, the cyclonic inlet diverter apparatus and methods can provide several significant advantages and benefits over other systems and methods for initiating the separation of the mixed or multi-phase fluid currently available in the art. However, the recited advantages are not meant to be limiting in any way, as one skilled in the art will appreciate that other advantages may also be realized upon practicing the present disclosure.

Furthermore, those skilled in the relevant art will recognize that changes can be made to the described embodiments while still obtaining the beneficial results. It will also be apparent that some of the advantages and benefits of the described embodiments can be obtained by selecting some of the features of the embodiments without utilizing other features, and that features from one embodiment may be combined with features from other embodiments in any appropriate combination. For example, any individual or collective features of method embodiments may be applied to apparatus, product or system embodiments, and vice versa. Accordingly, those who work in the art will recognize that many modifications and adaptations to the embodiments described are possible and may even be desirable in certain circumstances, and are a part of the disclosure. Thus, the present disclosure is provided as an illustration of the principles of the embodiments and not in limitation thereof, since the scope of the invention is to be defined by the claims.

Referring now in more detail to the drawing figures, FIGS. 1-4 illustrate one embodiment of a linear or elongate multi-phase separator 10 or similar water clarification system for a separating a mixed or multi-phase fluid into its separate constituents. The multi-phase separator 10 can be configured to receive a multi-phase fluid, including but not limited to produced fluids from oil production facilities, and separate the individual phases and components of the multi-phase fluid into separate streams of substantially clarified components. The multi-phase fluid can come straight from one or more producing wellheads, or in the alternative may be oily water that is received after passing through an earlier or upstream oil/water separation process. In one representative embodiment an inlet stream of produced multi-phase fluid may comprise a water component greater than or about 75% to 95% by volume, an oil component less than or about 25% to 5% by volume, a gas component in solution, and a particulate matter component that is less than or about 5% by volume. Upon passing through the multi-phase separator 10, the same multi-phase fluid will have been separated into an oil outlet stream, a gas outlet stream, discrete accumulations of solids and sludge that can be periodically removed or flushed from the separation system, and a primary clean water outlet stream having less than or about a desired upper threshold limit of oil (or under appropriate conditions less than or about 100 ppm of oil), a greatly-reduced amount of gas in solution, and with any entrained particulate matter in suspension being less than or about, for example, 200 microns in size.

As can be seen in the drawings, the linear or elongate multi-phase separator 10 generally comprises a separator vessel 20 having cylindrical body 22 with a circular cross-section, and can further include a rounded inlet end cap 24 at an inlet end 23, and an outlet end cap 26 at an outlet end 29, which in one aspect can be partially hemispherical. It will be understood, however, that other shapes (including but not limited to oblong, square, or other non-circular cross-sectional shapes and end caps), inclinations (substantially horizontal or vertical), and configurations for the multi-phase separator 10 are also possible and considered to fall within the scope of the present disclosure.

An inlet flow of mixed or multi-phase fluid (including but not limited to the produced oily water described above) can be introduced into the partially-filled separator vessel 20 at the inlet end 23, such as through the inlet end cap 24, and from there directed to gradually flow forward toward the discharge or outlet end 29, at low speed and with a maximum retention time, so as to encourage natural gravity-based separation of the components of the multi-phase fluid. In the salt water disposal (SWD) application referenced above, the inlet flow of produced oily water into the water clarification system generally includes gases and vapors, oil, water, and particulate matter (such as sand), and can further include additional impurities or contaminants such sludge, dirt, semisolid paraffins, and the like.

As shown in the drawings, the inlet flow is introduced into the partially-filed separator vessel 20 through the cyclonic inlet diverter 40 that can be internally mounted within the separator vessel 20 adjacent the inlet end cap 24 and above the internal fluid level 14 of the separator vessel 20, whether horizontal or vertical. The cyclonic inlet diverter 40 is configured to provide an initial separation of the various constituents or components of the inlet flow of mixed or multi-phase fluid. As described in detail below, for instance, the inlet diverter 40 can be configured to divert or split the inlet flow from the fluid source into sub-streams having substantially equal flow rates, and then impart a cyclonic motion to each the sub-streams that provides for an initial centrifugal separation of the mixed constituents. A majority portion of each sub-stream constituent can then be directed out of the inlet diverter 40 through different outlet ports, resulting in an initial separation of the inlet flow that improves the overall efficiency of the multi-phase separator 10. Although illustrated as splitting the inlet flow into two equal sub-streams, it is foreseen that the inlet diverter may be modified into a single stream device or to split the inlet flow into more than two sub-streams.

It will be appreciated that cyclonic inlet diverter 40 is not required to achieve an initial high separation efficiency of the fluid constituents. For example, in one aspect an initial separation efficiency of the inlet diverter 40 can be between about 60% to 80%, which can be sufficient to increase the overall separation efficiency of the multi-phase separator 10 or separation system to between about 95% to 99%. Additionally, the cyclonic inlet diverter 40 may be adapted or configured for the specific composition and flow rate of the inlet flow being introduced into the multi-phase separator 10.

Generally, the cyclonic inlet diverter 40 is configured for high but controlled and carefully directed flow velocities to initiate separation of constituents via dynamic centrifugal action, as described in more detail below (see FIGS. 16-20). In contrast, the multi-phase separator 10 can be configured for reduced fluid flow velocities and the low-turbulence movement of fluids. For example, after initial separation of the constituents by the cyclonic inlet diverter 40, the multi-phase separator 10 provides for full or high efficiency separation of the constituents through improved low velocity, laminar flow, gravity-based separation. To perform this function, the multi-phase separator 10 can include additional internal components and configurations that encourage low velocity laminar flow from the inlet end 23 through to the outlet end 29, thereby fully utilizing the entire length of the separator vessel 20 to encourage continuous separation of the constituents.

It will be further appreciated that the overall system, including both the multi-phase separator 10 and the cyclonic inlet diverter 40 enclosed therein, is scalable to accommodate a wide range of flow rates. In addition, the cyclonic inlet diverter 40 and the multi-phase separator 10 can be function through a wide range of pressures, ranging from low pressure (partial vacuum), non-pressurized (i.e. atmospheric conditions), to high pressure conditions (for separation systems designed for high pressure fluid flows), up to and about fluid pressures of 3000 psi. It will be appreciated that the pressurization state is determined by the multi-phase separator 10, with the cyclonic inlet diverter 40 being installed as an internal component.

With continued reference to FIGS. 1-4, the separator vessel 20 housing the components that together form the multi-phase separator 10 or separation system may be horizontally disposed above a ground surface, as illustrated in the horizontal embodiment shown in the drawings. In one representative embodiment the separator vessel 20 is tubular with a length of about 240" (20') and a diameter of about 72" (6'). As noted above, however, the separator vessel 20 is scalable in size to accommodate a wide range of flow rates. For the horizontal embodiment of the multi-phase separator 10 illustrated in the drawings, the separator vessel 20 includes a longitudinal or centerline axis 21 that defines a horizontal centerline plane 25 and a vertical centerline plane 27, with the multi-phase fluid generally moving along the longitudinal axis 21 (with some transverse flow components) from the inlet end 23 toward the outlet end 29 throughout the separation process. Although not shown, it is foreseen that the separator vessel may also be vertically disposed above the ground surface.

In addition to the cyclonic inlet diverter 40 being internally mounted within the separator vessel 20 adjacent the inlet end cap 24, the multi-phase separator 10 can also include a plurality of baffle plates spaced along the length of the horizontally disposed separator vessel 20, from the inlet end toward the discharge end. The baffle plates 70 can serve to sub-divide a separation portion of the separator vessel into a plurality of separation zones 34. In the illustrated embodiment, for example, there are three baffle plates 70 sub-dividing the separation portion into four separation zones 34, 36, followed by a weir plate 80 defining an oil outlet portion/zone 38 that is separate from the separation portion/zones 34, 36. However, it is foreseen that a different number of baffle plates be used to decrease or increase the number of separation zones.

Generally, the baffle plates 70 extend laterally across the interior of the separator vessel (perpendicular to the longitudinal axis) to form a solid connection with the lower and center portions of the separator sidewall. The baffle plates can extend above the fluid level 16 of the bulk fluid 14 in the separator vessel, but generally do not extend to the top portions of the separator sidewall, so as to provide an upper head space 30 in the separator vessel that allows for the free flow of gas and vapors from the inlet end 23 to the discharge end 29, where the gas/vapor constituent can exit the separator vessel 20 through a gas outlet 35. A lowermost portion 72 of each baffle plate 70 can be solid to prevent the flow of fluid along the bottom of the separator vessel, helping to create a lower quite zone that allows for sludge and solids to gently settle toward the bottom in the first three separation zones 34. The middle and upper portions of each baffle plate includes slots or apertures 74 that serve to stratify the fluid as it flows through the baffle plates, thereby improving retention time. The water layer/constituent is withdrawn from a water outlet 37 located at the bottom of the final (or fourth) separation zone 36.

The multi-phase separator 10 can further include a weir plate 80 proximate to but spaced from the discharge end serves to divide an oil outlet portion/zone 38 from the separation zones 34, 36 defined by the plurality of baffle plates 70. The weir plate 80 extends laterally across the interior of the separator vessel (perpendicular to the longitudinal axis) to form a solid connection with the lower and center portions of the separator sidewall. The weir plate 80 can also be entirely solid and impenetrable across the face thereof, causing the oily top layer/constituent of the fluid flow to pour over the top edge and down into the oil outlet portion 38. The height of the weir plate 80 can be less than the height of the baffle plates 70, and can serve to set the height of the fluid level 16 within the separator vessel. The oil layer/constituent is withdrawn from an oil outlet 39 located at the bottom of the oil outlet portion/zone 38.

It will be appreciated that the separator vessel 20 generally has a welded steel construction, and that most, if not all, of the separate components enclosed therein, such as the baffle plates 70, the weir plate 80, and any additional fittings and piping, generally also have a welded steel construction. If pressurized, the separator vessel 20 and the additional fittings and piping can be compliant with Section VIII of the ASME Boiler and Pressure Vessel Code. Moreover, as shown below, the cyclonic inlet diverter 40 can also have a welded steel construction, although it is foreseen that the inlet diverter may also been formed with a plastic or fiberglass construction, given its location entirely within the volume defined by the separator vessel.

One embodiment of the cyclonic inlet diverter 40 is shown in further detail in FIGS. 5-15. Relative to the separator vessel 20, the inlet diverter 40 generally comprises a much smaller enclosed tubular body 42 defining a diverter longitudinal axis 41, and having opposed end walls 48, a tubular sidewall 46 extending between the opposed end walls 48, and a midline inlet port 44 located midway between the end walls. The diverter longitudinal axis 41 is oriented substantially parallel with and above the separator vessel's horizontal centerline plane 25, and is substantially perpendicular to the separator vessel's vertical centerline plane 27. The representative embodiment of the inlet diverter 40 shown in the drawings can have a length of about 36" (3') and a diameter of about 9", but it is understood that the inlet diverter 20, like the multi-phase separator 10, is also scalable in size to accommodate a wide range of flow rates.

The inlet diverter 40 can also include an inlet port 44 that is horizontally located (i.e. along the diverter longitudinal or centerline axis) midway between the opposed end walls, and that can be vertically located in an offset position to the longitudinal axis (i.e. above or below a diverter horizontal centerline plane) so the inlet flow enters directly into the upper or lower half or hemisphere of the inlet diverter. Thus, in one aspect the fluid flow through the inlet port 44 can be substantially tangential to an upper or lower portion, respectively, of the inlet diverter tubular sidewall 46. In the embodiment of the cyclonic inlet diverter 40 shown in FIGS. 5-15, for example, the inlet port 44 is vertically offset above the diverter's horizontal centerline plane 45, so that the inlet flow enters the tubular body 42 substantially tangential to the upper portion of the inlet diverter's tubular sidewall 46 and is directed downwardly upon reaching the far portion of the sidewall to initiate the cyclonic motion of the fluid flow. The inlet port 44 can include welded piping to a flange connection 43 that is, in turn, bolted to an internal inlet flange within the separator vessel 20. In one aspect the inlet diverter 40 can be entirely supported within the separator vessel by the inlet port flange and piping.

Internal components, such as a splitter plate 50 positioned within a center portion of the inlet diverter with a forward edge 52 aligned with the center of the inlet port 44, can split the inlet fluid flow into a first sub-stream and a second sub-stream as it enters through the inlet port 44, with each sub-stream flowing outward through the tubular body 42 toward an end wall 48. With the inlet port 44 located above the diverter horizontal centerline plane, the splitter plate 50 and round tubular sidewall 46 of the tubular body 42 can naturally initiate the cyclonic motion of the fluid as it flows around and downwardly across the far portion of the tubular sidewall, following the circular contour of the inner sidewall surfaces. Constrained by the tubular sidewall 46, the sub-streams also flow laterally outward and away from the splitter plate 50 until they encounter additional internal components, such as swirl plates 54, which can be positioned on each side of the splitter plate 50 to increase the cyclonic motion of the sub-streams. Through centrifugal action or separation, the cyclonic flows can quickly push the heavier constituents (solids and water) further outward toward the interior rounded surfaces of the tubular sidewall than the lighter constituents (gas and oil).

As their name suggests, the swirl plates 54 can have angled surfaces configured to increase the cyclonic motion in the first and second sub-streams within the tubular body. In one aspect the swirl plates can be located about one complete revolution from the splitter plate 50 and inlet port 44, with the lower hemispheres 56 of the swirl plates 54 extending completely across the lower half of the tubular body to constrain and control the sub-streams flowing through the splitter plate. The upper hemisphere of swirl plates can be split, with inlet sides 57 of the split being angled downstream or away from the splitter plate, and the far sides 58 of the split being angled upstream or toward the splitter plate, so as to capture and direct the steams through a V-shaped passage defined by the two angled surfaces. Furthermore, the trailing edge of the upper hemisphere inlet side angled surface may include an additional rigid flap portion 59 that is angled to further control or concentrate the sub-streams as they pass through the V-shaped passage, thereby increasing the cyclonic motion. It will be appreciated that additional modifications or other designs for the internal components of the inlet diverter 40, including but not limited to the splitter plate 50 and the swirl plates 54, are also possible and considered to fall within the scope of the present disclosure.

The cyclonic inlet diverter shown in FIGS. 5-15 can further include multiple outlet ports on each end of the tubular body 42, with a separate outlet port for a majority portion of each constituent of the mixed fluid on each side. For instance, the tubular body 42 of the inlet diverter can include an elongate aperture or slot 60 formed through the bottom sidewall portions of the tubular body on each side of the splitter plate 50, which can serve to define particulate matter or solids outlet ports. In one aspect the solids outlet ports can further include an internal fin 61 on the downstream side of the solids outlet port 60 to better capture and re-direct the solids constituent of the sub-stream downward through the outlet port. Particulate matter and other solids will be carried in a portion of the fluid, so that the material exiting the solids outlet port 60 will generally form a falling sheet of dirty liquid.

The tubular body 42 of the inlet diverter can also include an aperture 62 formed through each opposing end wall 48 and centered about the diverter longitudinal axis 41, which can serve as a gas outlet port 62.

As shown in the drawings, the tubular body 42 can further include a first radial aperture 64 formed through the lateral sidewall portions of the tubular body adjacent to each opposing end wall 48, which can serve as a water outlet port. In one aspect the water outlet port 64 can be formed into the inlet side of the lateral sidewall portion, so the fluid passing through the port is directed back onto the interior surface of the inlet end cap 24 of the separator vessel 20, and then flows downward along the interior surface of the end cap 24 as a substantially laminar sheet, into the bulk fluid 14 contained in the separator vessel. This feature can function to reduce turbulence as the inlet streams enter the bulk fluid 14, as well as to increase the retention time of the newly delivered fluid within the multi-phase separator.

The tubular body 42 can further include a second radial aperture 66 formed through the lateral sidewall portions of the tubular body 42 between each first aperture 64 and the midline inlet port 44, which can serve as an oil outlet port. The oil outlet port 66 also can be formed into the inlet side lateral sidewall portion, so the fluid passing through the oil outlet port is also directed back onto the interior surface of the inlet end cap 24 of the separator vessel 20, and then flows downward along the interior surface as a substantially laminar sheet, into the bulk fluid 14 contained in the separator vessel 20. In most cases where the oil constituent of the mixed fluid is less than the water constituent, the oil outlet port can be smaller than the water outlet port.

It is understood that the representative embodiment of the cyclonic inlet diverter 40 shown in FIGS. 5-15 is generally configured to interface with the linear or multi-phase separator 10 shown in FIGS. 1-4, and which together can be configured or tailored for separating the constituents of the produced multi-phase fluid described above. It will be further understood that both the cyclonic inlet diverter 40 and the overall multi-phase separator 10 are fully customizable and reconfigurable as desired by one of skill in the art, and that each of the inlet diverter 40, the inlet port 44, the internal components 50, 54, and the outlet ports 60, 62, 64, 66 can be customized or adjusted for both a particular flow rate and for a specific mixture of constituents.

Although not shown in detail, the multi-phase separator 10 can further include an inlet flow speed gate, or control valve, upstream of the cyclonic inlet diverter 40. The inlet flow speed gate can be used to control the velocity of the inlet flow into the cyclonic inlet diverter, so as to maintain a predefined velocity of the fluid in variable (e.g. generally decreasing) flow rate conditions. It will be appreciated that maintaining the speed of the fluid entering the inlet diverter 40 can provide for an optimal separation of the fluid constituents, and can also serve to reduce emulsions of the oil and water mixture, improving the overall performance of the multi-phase separator 10. In one aspect the inlet flow speed gate can be a reed-type valve with a plastic or metal reed member. However, other types of speed-based flow control valves are also possible and considered to fall within the scope of the present disclosure.

Figure 16:
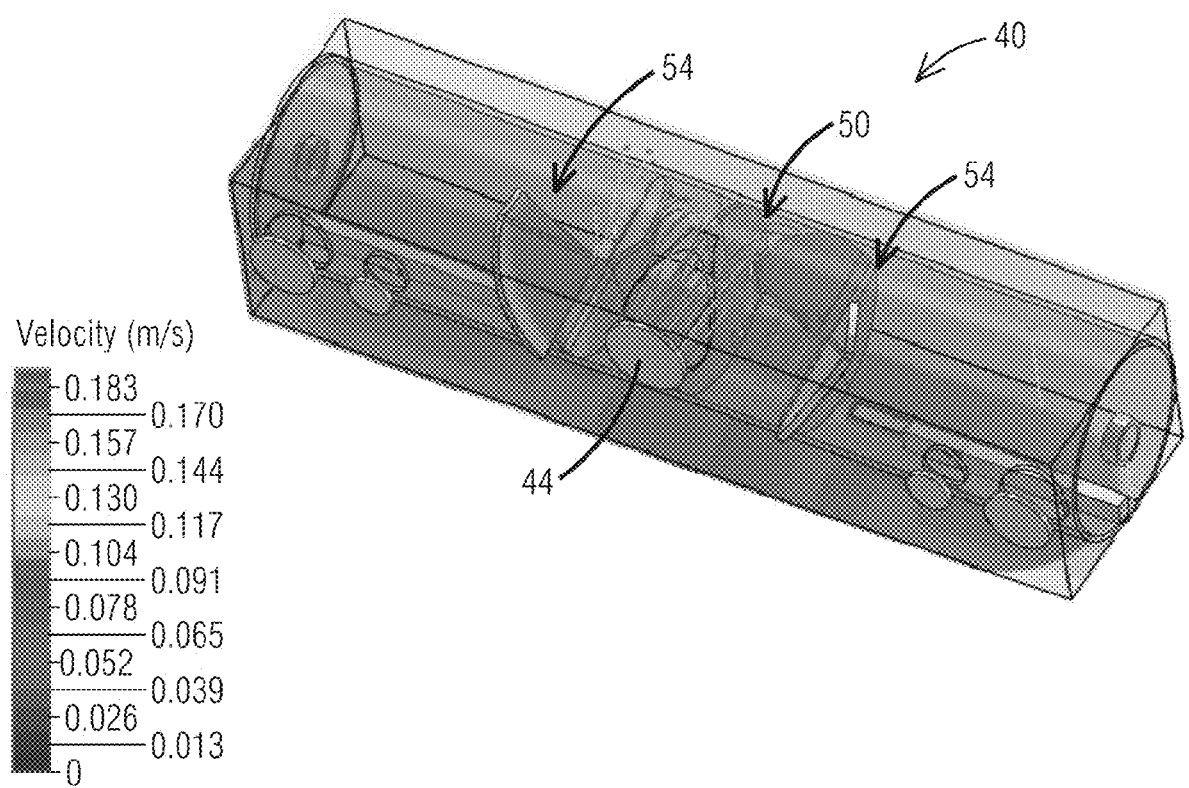
FIG. 16 is a schematic diagram of fluid velocities as the inlet flow is received into the cyclonic inlet diverter of FIG. 5 through the inlet port and encounters the splitter plate.

With reference to FIGS. 16-20, during operation of the multi-phase separator 10 the inlet flow speed gate (not shown) can control the velocity of the inlet flow of a mixed or produced multi-phase fluid to a desired range of values. As shown in FIG. 16, the inlet flow is first received through the inlet port 44, upon which it immediately encounters the splitter plate that divides and redirects the inlet flow into horizontal, oppositely-directed sub-streams. Together with the interior rounded surfaces of the tubular sidewall 46, the inlet port 44 and the splitter plate 50 initiate the cyclonic motion of the fluid around the diverter longitudinal axis 41 as it flows laterally outward and away from the midline splitter plate 50.

Figure 17:
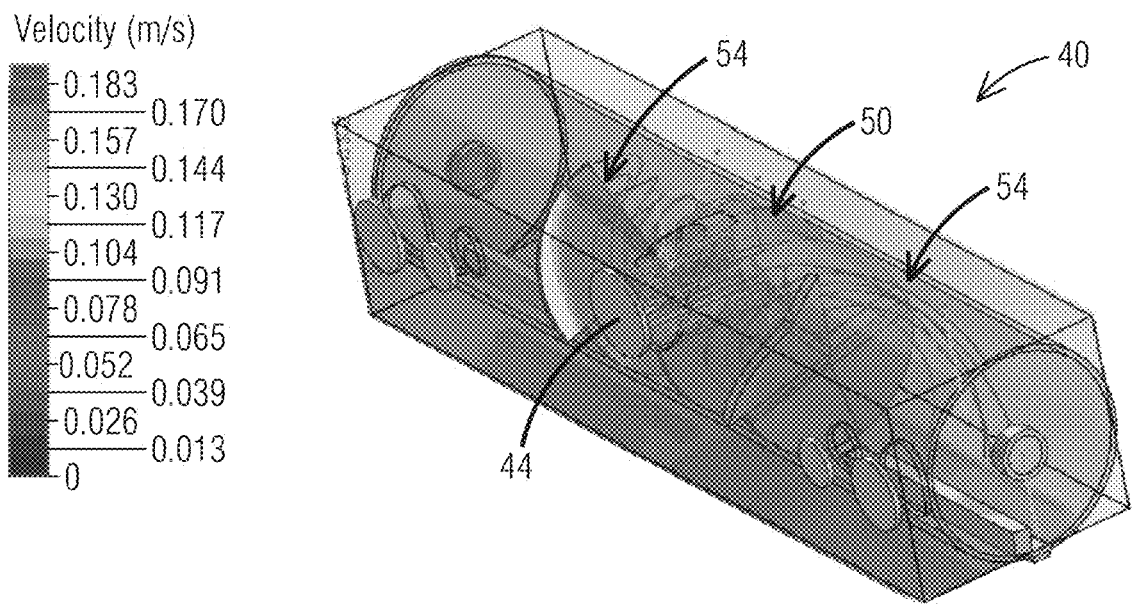
FIG. 17 is a schematic diagram of fluid velocities within the cyclonic inlet diverter of FIG. 5 as the inlet flow travels from the splitter plate through the swirl plates.

With reference to FIG. 17, the sub-streams can then encounter the swirl plates 54, which can amplify and focus the cyclonic motion of the sub-streams around the diverter longitudinal axis 41. Through centrifugal action/separation, the cyclonic flows quickly push the heavier constituents (solids and water) further outward toward the interior rounded surfaces and end walls 48 of the tubular vessel 42 than the lighter constituents (gas and oil), thereby establishing an initial separation between the constituents of the mixed or produced multi-phase fluid.

Figure 18:
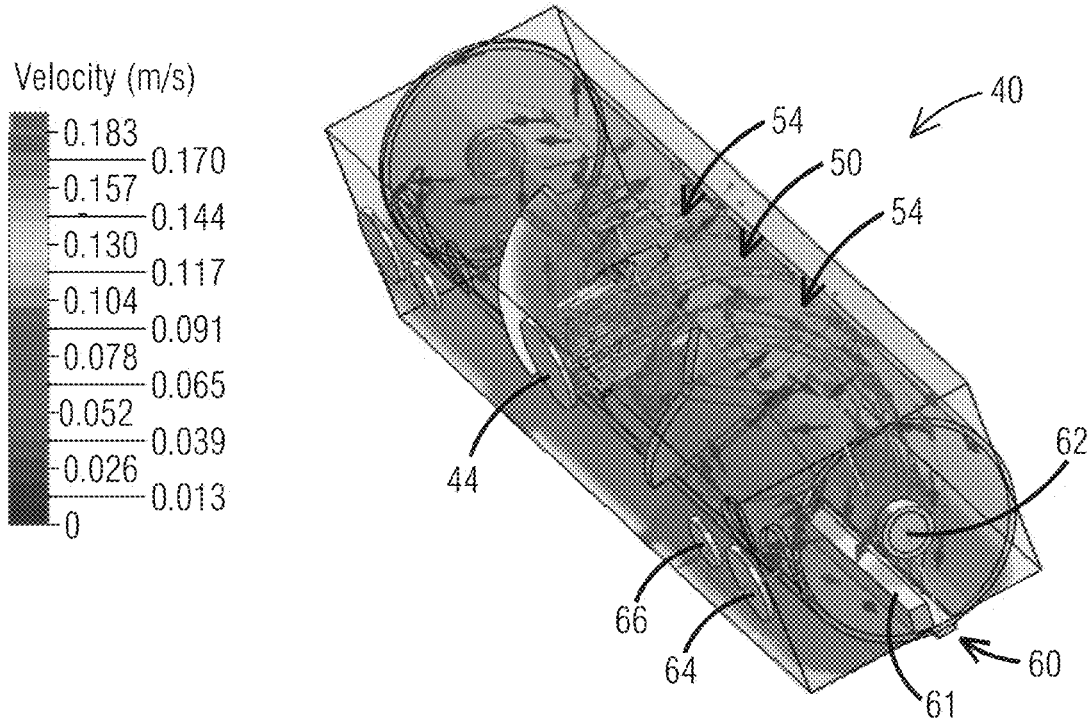
FIG. 18 is a schematic diagram of fluid velocities within the cyclonic inlet diverter of FIG. 5 as the inlet flow travels beyond the swirl plates toward the end caps of the inlet diverter.
Figure 19:
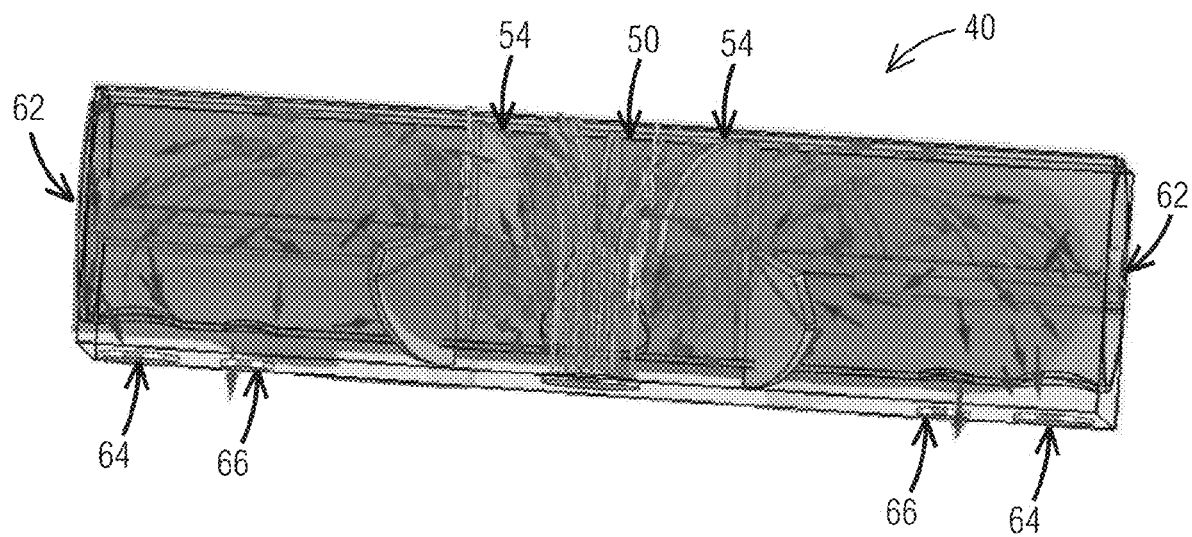
FIG. 19 is another schematic diagram of fluid velocities within the cyclonic inlet diverter of FIG. 5 as the inlet flow travels beyond the swirl plates toward the end caps of the inlet diverter.
Figure 20:
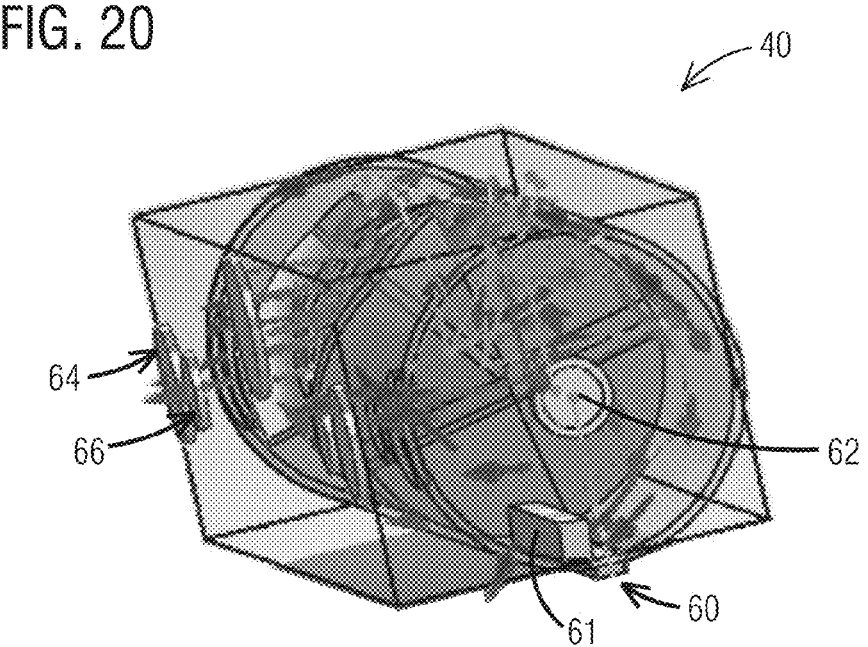
FIG. 20 is yet another schematic diagram of fluid velocities within the cyclonic inlet diverter of FIG. 5 as the inlet flow travels beyond the swirl plates toward the end caps of the inlet diverter.

With reference to FIG. 18-20, the different fluid constituents can be further separated via their respective outlet ports. With regards to the any particulate matter or solids included in the inlet flow, for example, the cyclonic motion imparted by the swirl plates and the placement of the solids outlet ports 60 in the bottom sidewall portion of the tubular body, along with the internal fins 61, preferentially directs any solid particles in the produced fluid, together with a portion of the fluid, directly downward out of the inlet diverter 40, in the form of a liquid sheet falling toward the bottom of the separator vessel 20.

With regards to the water constituent of the inlet flow, the cyclonic motion imparted by the swirl plates 54 and the placement of the larger water outlet port 64 at the far opposite ends of the tubular body 42 directs a majority portion of the heavier water constituent outwards and back towards the inlet end cap 24 of the separator vessel 20, placing the water constituent at the furthest point from the liquid outlets of the separator vessel 20 to allow for the maximum retention time allowed by the design of the multi-phase separator 10.

With regards to the oil constituent of the inlet flow, the cyclonic motion imparted by the swirl plates 54 and the placement of the smaller oil outlet port 66 (inward but adjacent to the water outlet port) directs a majority portion of the oil constituent towards the inlet end cap 24 of the separator vessel 20, also placing the lighter oil constituent at the furthest point from the liquid outlets (but in a separate stream from the water constituent), so as to allow for the maximum retention time allowed by the design of the multi-phase separator 10.

With regards to the gas constituent of the inlet flow, the gas constituent is least affected by the cyclonic motion imparted by the swirl plates 54, so that the placement of the gas outlet ports 62 through the end walls 48 of the tubular body 42, and centered about the diverter longitudinal axis 41, directs the majority portion of the gas constituent out the gas outlet ports 62 of the apparatus 40 and into the head space 30 of the separator vessel 20. Moreover, any residual gas that remains entrained within the liquid water and oil constituents can continue to bubble up from the bulk fluid 14 as it slowly flows from the inlet end 23 to the discharge end 29 of the separator vessel 20.

As indicated above, the elongate multi-phase separator and the cyclonic inlet diverter enclosed therein have been described herein in terms of preferred embodiments and methodologies considered by the inventor to represent the best mode of carrying out the invention. It will be understood by the skilled artisan, however, that a wide range of additions, deletions, and modifications, both subtle and gross, may be made by those of skill in the art to the illustrated and exemplary embodiments of the elongate multi-phase separator and the cyclonic inlet diverter without departing from the spirit and scope of the present disclosure.

What is claimed is:

1. A method for initiating the separation of a multi-phase inlet fluid flow received from a fluid source and including at least a gas constituent, an oil constituent, a water constituent, and a solids constituent, the method comprising:
   receiving the inlet fluid flow in an inlet pipe;
   directing the inlet fluid flow toward an inlet diverter mounted within an elongate separator vessel, the separator vessel being orientated substantially horizontal relative to a ground surface and having an inlet end, a discharge end opposite the inlet end, separator sidewalls extending between the inlet end and the discharge end, and a separator longitudinal axis defining a horizontal centerline plane and a vertical centerline plane, the inlet diverter being positioned crosswise within the separator vessel proximate the inlet end and substantially centered on the vertical centerline plane, and having a diverter longitudinal axis orientated substantially perpendicular to the vertical centerline plane and substantially parallel with the horizontal centerline plane;
   introducing the inlet fluid flow into the inlet diverter along the vertical centerline plane;
   splitting the inlet fluid flow into a first stream and a second stream within the inlet diverter;
   directing the first and second streams into a pair of cyclonic flows centered around the diverter longitudinal axis and directed laterally-outward in opposite directions and toward opposite ends of the inlet diverter;
   redirecting at least a majority portion of the solids constituent of the first and second streams downward and outward from the inlet diverter toward a bottom of the separator vessel;
   redirecting at least a majority portion of the gas constituent of the first and second streams in opposite axial directions relative to the diverter longitudinal axis and outward from the inlet diverter toward opposing internal surfaces of the separator sidewalls; and
   redirecting at least a majority portion of the oil constituent and the water constituent of the first and second streams laterally-outward from the inlet diverter in a radial direction relative to the diverter longitudinal axis.

2. The method of claim 1, further comprising controlling an average velocity of the fluid flow so as to be maintained above a minimum inlet velocity for inducing the cyclonic flows within the inlet diverter.

3. The method of claim 1, wherein the inlet diverter within the separator vessel is positioned above the horizontal centerline plane of the separator vessel.

4. The method of claim 1, wherein the separator sidewalls are substantially tubular.

5. The method of claim 1, wherein splitting the fluid flow into a first stream and a second stream further comprises directing the fluid flow onto a forward edge of a splitter plate that is centered within the inlet fluid flow.

6. The method of claim 1, wherein directing the first and second streams into a pair of cyclonic flows further comprises directing each stream onto at least one swirl plate having angled surfaces configured to induce or increase cyclonic motion.

7. The method of claim 1, wherein redirecting the at least a majority portion of the solids constituent of the first and second streams downward and outward from the inlet diverter further comprises redirecting the solids constituent downward through elongate apertures formed through a bottom of the inlet diverter on each side of the vertical centerline plane.

8. The method of claim 1, wherein redirecting the at least a majority portion of the gas constituent of the first and second streams in opposite axial directions and outward from the inlet diverter further comprises directing the gas constituent through axial apertures formed into opposite ends the inlet diverter.

9. The method of claim 1, wherein redirecting the at least majority portions of the oil constituent and the water constituent of the first and second streams further comprises redirecting the oil constituent and the water constituent through at least one radial aperture formed into lateral sidewalls of the inlet diverter on each side of the vertical centerline plane and proximate the opposite ends of the inlet diverter.

10. The method of claim 9, wherein the at least one radial aperture formed into the diverter sidewalls on each side of the vertical centerline plane further comprises a pair of radial apertures.

11. The method of claim 10, wherein the pair of radial aperture formed into the diverter sidewalls on each side of the vertical centerline plane are of different sizes, with a larger radial aperture being nearest to an end of the inlet diverter.

12. The method of claim 10, further comprising redirecting the at least a majority portion of the of the oil constituent of the first and second streams through a radial aperture nearest to the vertical centerline plane and redirecting the at least a majority portion of the of the water constituent of the first and second streams through a radial aperture being nearest to an end of the inlet diverter.

13. The method of claim 1, further comprising redirecting the oil constituent and the water constituent laterally-backward toward an internal surface of the inlet end of the separator vessel.

14. The method of claim 1, wherein the diverter sidewalls are substantially tubular.

15. A system for initiating the separation of a multi-phase inlet fluid flow received from a fluid source and including at least a gas constituent, an oil constituent, and a water constituent, the system comprising:
   an elongate separator vessel having an inlet end, a discharge end opposite the inlet end, separator sidewalls extending between the inlet end and the discharge end, and a separator longitudinal axis defining a horizontal centerline plane and a vertical centerline plane;
   an inlet diverter comprising an elongate tubular body mounted crosswise within the separator vessel proximate the inlet end and having a diverter longitudinal axis orientated substantially perpendicular to the vertical centerline plane and substantially parallel with the horizontal centerline plane, the inlet diverter including:
      a splitter plate positioned within a center portion of the tubular body and configured to split the inlet fluid flow into a first stream and a second stream;
      at least one swirl plate positioned on each side of the splitter plate and having angled surfaces configured to increase cyclonic motion of the first and second streams within the tubular body;
      at least one elongate aperture formed through bottom portions of the tubular body on each side of the splitter plate;
      at least one axial aperture formed through each opposing end of the tubular body; and
      at least one radial aperture formed through lateral sidewall portions of the tubular body proximate each opposing end of the tubular body; and
   an inlet pipe configured to direct the inlet fluid flow from the fluid source into the center portion of the tubular body to split the inlet fluid flow with the splitter plate, to induce the cyclonic motion with the swirl plates, and to initiate the separation of the multi-phase inlet fluid flow, wherein
   at least a majority portion of a solids constituent is directed downwardly outward from the inlet diverter through the elongate apertures,
   at least a majority portion of the gas constituent is directed axially outward from the inlet diverter through the axial apertures, and
   at least a majority portion of the oil constituent and at least a majority portion of the water constituent are directed laterally outward from the inlet diverter through the at least one radial aperture proximate each opposing end the tubular body.

16. The system of claim 15, wherein the inlet diverter is centered on the vertical centerline plane.

17. The system of claim 15, wherein elongate separator vessel is orientated substantially horizontal relative to a ground surface.

* * * * *